Sept. 6, 1966  JAMES E. WEBB  3,270,990
ADMINISTRATOR OF THE NATIONAL AERONAUTICS
AND SPACE ADMINISTRATION
ABSORPTIVE SPLITTER FOR CLOSELY SPACED
SUPERSONIC ENGINE AIR INLETS Filed Dec. 8, 1964

INVENTOR
HOWARD KASTAN
BY
Charles C. Wells
ATTORNEYS

Sept. 6, 1966  JAMES E. WEBB  3,270,990
ADMINISTRATOR OF THE NATIONAL AERONAUTICS
AND SPACE ADMINISTRATION
ABSORPTIVE SPLITTER FOR CLOSELY SPACED
SUPERSONIC ENGINE AIR INLETS
Filed Dec. 8, 1964
2 Sheets-Sheet 2
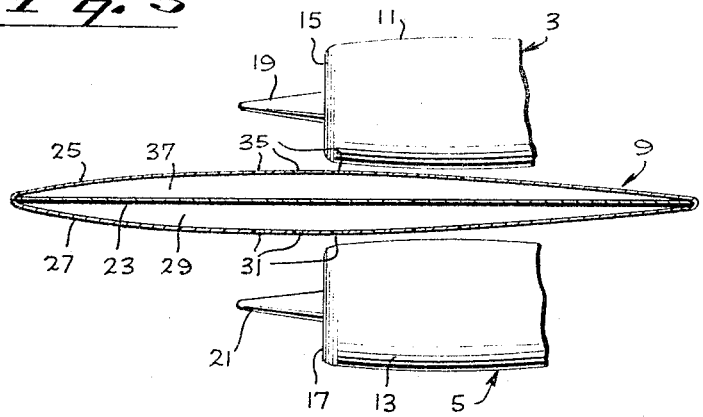
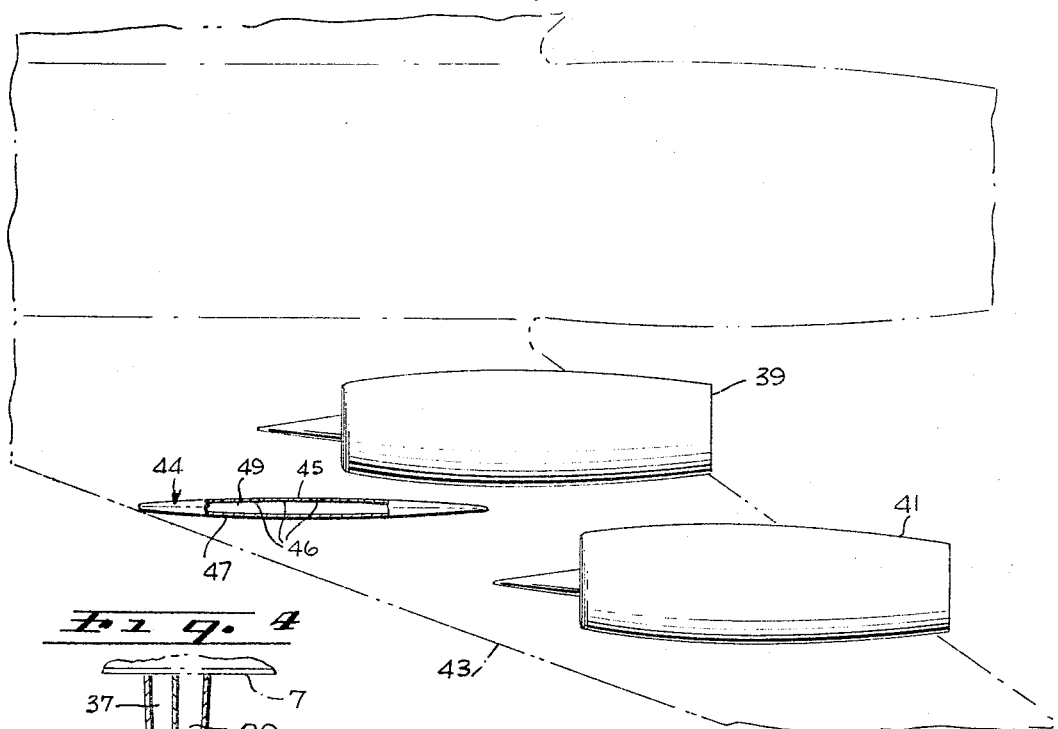
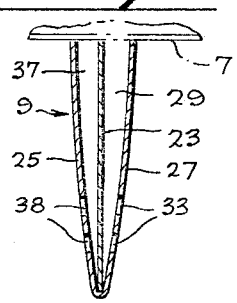
INVENTOR
HOWARD KASTAN
BY
Charles C. Wells
ATTORNEYS 3,270,990
ABSORPTIVE SPLITTER FOR CLOSELY SPACED
SUPERSONIC ENGINE AIR INLETS
James E. Webb, Administrator of the National Aeronautics and Space Administration with respect to an invention of Howard Kastan
Filed Dec. 8, 1964, Ser. No. 416,946
4 Claims. (Cl. 244—53)

This invention relates generally to the mounting of jet engines on supersonic aircraft. More particularly, it is an absorptive barrier assembly mounted between jet engines to permit the mounting of such jet engines in close proximity to one another. The term jet engine as used herein is intended to mean thermo or air breathing jet engines.

A problem or limitation encountered in the designing of supersonic aircraft lies in the placement of the jet engines on the aircraft. It has been found that mounting the engines in a closely spaced relation results in interference effects between the engines which can cause one or more of the engines to fail during supersonic flight.

For example, when a supersonic aircraft is flying at design conditions or a cruise speed somewhere in the supersonic range and one reason or another an engine fails or unstarts, the airflow through such engine is suddenly disrupted. This disruption of the airflow affects the pattern of shock waves generated at the forward end of the engine. When this occurs a shock wave generated by the engine which failed may enter the air inlet of a closely adjacent engine and cause a failure thereof. Engine failure can result from this due to the fact that airflow to a jet engine operating at supersonic speeds is very critical and any extraneous shock waves which reach the inlet will cause a sufficient disruption of the airflow to cause engine failure.

The undesirable situation mentioned above has been avoided heretofore primarily in two ways. One way is to provide substantial separation of the engine air inlets so that there is no change of any interference therebetween. While this method is effective it is not always desirable in that it renders unusable many otherwise good vehicle designs which require close engine spacing. A current method of eliminating these adverse effects consists of using a single air inlet for more than one engine with by-pass doors downstream to divide the airflow to each engine. This method however is not completely satisfactory in that it requires very sophisticated mechanisms to control and distribute the airflow to the engines.

The present invention provides an absorptive barrier assembly that is mounted to the aircraft in a position between two closely spaced engines. The assembly includes a solid barrier plate which effectively isolates the air inlets of the engines by preventing the shock waves generated by one engine from reaching the other. The assembly, in addition to providing a barrier between the engines, is constructed such that it is nonreflective, i.e., will not reflect shock waves back to the engine generating such shock waves. It is necessary that the assembly be nonreflective so as to eliminate the possibility that, during off design flight speeds, a shock wave generated by one of the engines will impinge on the barrier assembly and be reflected back into its own air inlet. The diffuser section of a jet engine can be designed such that at cruise or design speed the airflow to the engine is idealized and the shock wave produced by the diffuser will be contained in the inlet of the engine. However, when the aircraft is operating below or above design speed, shock waves are generated which can impinge upon and be deflected off the barrier and back into the engine air inlet to cause a malfunction or failure of the engine. The barrier is made nonreflective by attaching perforated arcuate side panels to each side of the barrier plate. The side panels, in conjunction with the solid barrier plate, form a cavity that receives and absorbs any shock waves generated by the engines mounted adjacent thereto. The side panels have exit vents to relieve any pressure buildup within the cavity.

It is therefore an object of this invention to provide a barrier assembly for use on a supersonic aircraft that permits greater freedom in engine location.

Another object of this invention is to provide a device that effectively isolates the air inlets of closely spaced jet engines so that failure of one engine during supersonic flight will not cause an adjacent engine to fail.

A yet further object of this invention is to provide a barrier assembly that will not reflect shock waves impinging thereon.

These and other objects and advantages of the invention will become more apparent when considering the following detailed description with the accompanying drawings wherein:

FIG. 3 is a view, partially in section, taken along lines 3—3 of FIG. 2;

FIG. 4 is a view in cross-section of the absorptive barrier assembly;

FIG. 5 is a view of the underside of an aircraft having a modified absorptive barrier assembly disposed between two jet engines mounted in a staggered relation on a highly swept wing.

Figure 1:
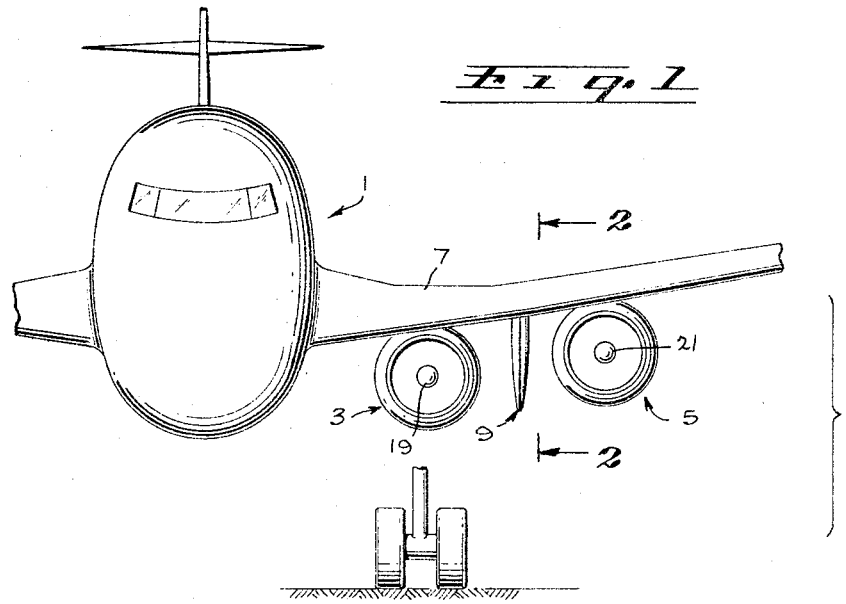
FIG. 1 is a view of an aircraft having two closely spaced jet engines mounted thereon with an absorptive barrier assembly mounted therebetween.

Referring now to the drawings, FIG. 1 illustrates an aircraft 1 having a pair of closely spaced jet engines 3 and 5 suspended from wing 7 in position between the two jet engines.

The jet engines illustrated herein (FIG. 3) are of a conventional type wherein the forward section of each engine is the diffuser section. The diffuser sections consists of ducts 11 and 13 having varying cross sectional area, air inlets 15 and 17, and variable position conical spikes 19 and 21. The diffuser type illustrated is termed a conical spike inlet diffuser and is the most efficient type for use with supersonic aircraft operating at high mach numbers. However, it should be understood that the present invention can be utilized with engines having other types of supersonic inlet diffusers.

Figure 2:
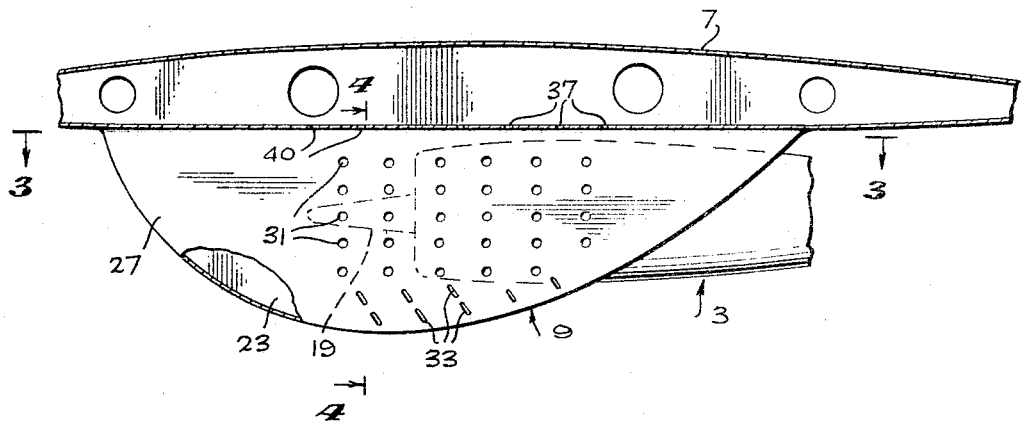
FIG. 2 is a view, partially in section, taken along lines 2—2 of FIG. 1.

The absorptive barrier assembly consists of a solid plate 23 that forms a barrier between the two engines and a pair of arcuate side panels 25 and 27, one of which is attached to each side of the centrally disposed barrier plate. Arcuate side panel 27 has a plurality of perforations 31 therein and it forms, in conjunction with plate 23, a cavity 29 that receives and absorbs shock waves produced by the spike of engine 5. Side panel 27 also includes louvers 33 (see FIG. 2) which vent or exhaust any pressure buildup that occurs in cavity 29 due to the entry of shock waves. Side panel 25 also has perforations 35 formed therein and provides, in conjunction with barrier plate 23, a similar cavity 37 that absorbs any shock waves produced by spike 19 of engine 3. Side panel 25 also has louvers 38 that vent cavity 37.

The jet engines of the engine installations illustrated herein are disposed closely adjacent to wing 7 in a position where shock waves generated thereby may strike the underside of the wing. It therefore may become necessary to provide the underside of the wing with perforations, as indicated at 37, to prevent the reflection of shock waves from the wing.

A second embodiment of the invention is illustrated in FIG. 4 wherein a pair of jet engines 39 and 41 are mounted in a staggered relation to the underside of a highly swept aircraft wing 43. In this embodiment a modified absorptive barrier assembly 45 is employed.

It is apparent from a consideration of FIG. 4 that engine 41 is mounted sufficiently readwardly that there is no danger of shock waves generated thereby affecting the operation of engine 39. Likewise, the absorptive barrier assembly is mounted sufficiently forward of engine 41 that shock waves produced thereby will not strike the barrier assembly. Thus, it is only necessary to protect engine 41 from engine 39 and to provide for absorption of shock waves from engine 39.

This is accomplished by an absorptive barrier assembly consisting of two arcuate side panels 45 and 47 connected together to form a streamlined body having a cavity 49 therein. Side panel 45 has perforations 46 formed therein to permit the entry of shock waves generated by engine 39 into the cavity. Side panel 45 is also provided with louvers (not shown) to exhaust pressure or energy trapped within the cavity. Inasmuch as side panel 47 is solid and thus provides a barrier plate, the centrally disposed barrier plate employed in the first embodiment can be omitted.

This completes the detailed description of the invention. While only two embodiments of the invention has been described herein there will be many changes and modifications thereto which can be made by one skilled in the art to which this invention pertains without departing from the spirit and scope of the invention as defined by the claims appended hereto.

What is claimed is:

1. A supersonic aircraft having at least two jet engines mounted thereon in close proximity to one another:
    (a) an absorptive barrier assembly mounted on said aircraft and disposed between said two engines, said assembly comprising:
        (1) a solid plate and
        (2) perforated and arcuate side panels mounted to the sides of said plate to form shock cavities that absorb any shock waves generated by the engines.

2. A supersonic aircraft engine installation comprising in combination:
    (a) an inboard jet engine suspended beneath one wing of said aircraft;
    (b) an outboard jet engine suspended beneath the one wing in a position closely adjacent to but rearwardly of said inboard jet engine;
    (c) an absorptive barrier assembly mounted to the underside of the one wing in a position between said inboard and outboard jet engines;
    (d) said absorptive barrier assembly including:
        (1) a solid arcuate panel adjacent said outboard engine that forms a shock wave barrier whereby a shock wave generated by said inboard engine will not reach said outboard engine;
        (2) a perforated arcuate panel disposed adjacent said inboard engine and joined with said solid arcuate panel to form a shock wave absorbing cavity to prevent shock waves generated by said inboard engine from being reflected back thereto; and
        (3) means for venting said shock wave absorbing cavity to relieve any pressure buildup therein.

3. An absorptive barrier assembly adapted for use between closely spaced jet engines mounted on a supersonic aircraft said barrier assembly comprising:
    (a) a solid plate for providing a barrier between the closely spaced jet engines whereby a shock wave generated by one of the engines will not interfere with the operation of the other;
    (b) an arcuate and perforated side panel attached to each side of said solid plate to form a shock absorbing cavity which minimizes the reflection of shock waves generated by the engines on each side of said absorptive barrier assembly.

4. In an engine mounting for a supersonic aircraft,
    (a) a first air breathing jet engine mounted on said aircraft;
    (b) a second air breathing jet engine mounted on said aircraft in close proximity to said first engine;
    (c) an absorptive barrier assembly attached to said aircraft and positioned between said first and second engines, said barrier assembly comprising:
        (1) a solid barrier plate for preventing interference effects between said first and second engines due to shock waves generated thereby at supersonic speeds;
        (2) a first perforated side panel attached to one side of said barrier plate to form a shock cavity for absorbing shock waves generated by said first jet engine;
        (3) a second perforated side panel attached to the other side of said barrier plate to form a shock cavity for absorbing shock waves generated by said second jet engine; and
        (4) means for venting said shock cavities to relieve any pressure buildup therein.

References Cited by the Examiner

UNITED STATES PATENTS 3,137,460   6/1964   Owl et al. _____ 244—53

FOREIGN PATENTS 653,544   5/1951   Great Britain.
759,491   10/1956   Great Britain.

MILTON BUCHLER, *Primary Examiner.*

L. C. HALL, *Assistant Examiner.*